Figure 1:
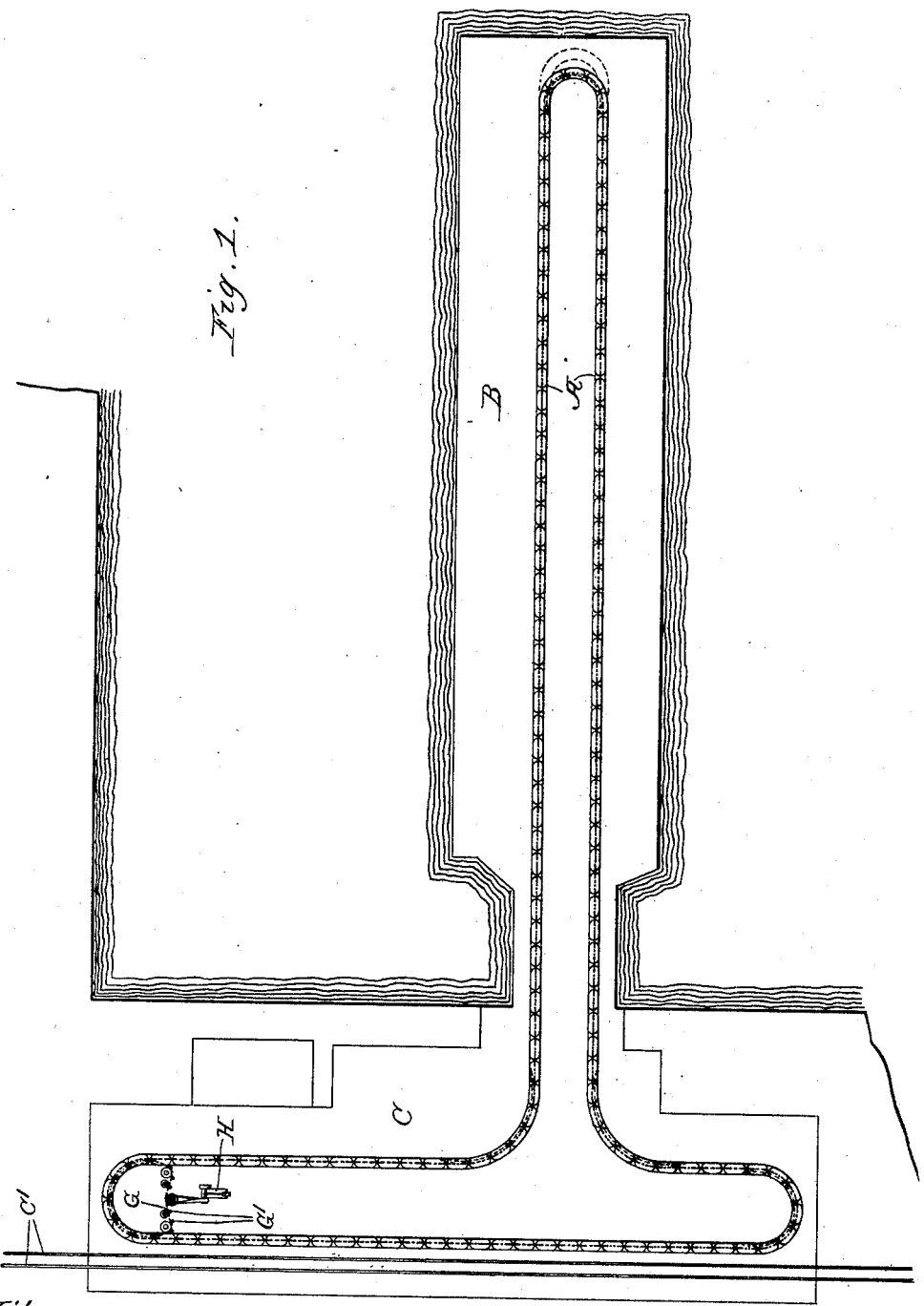

No. 716,932. Patented Dec. 30, 1902.
S. B. PECK.
PLATFORM CARRIER.
(Application filed July 20, 1900.)
(No Model.) 3 Sheets—Sheet 1.

Witnesses.
Edward T. Wray.
Homer L. Krogh.

Inventor.
Stanley B Peck
by Parker & Carter
his Atty's.

No. 716,932. Patented Dec. 30, 1902.
S. B. PECK.
PLATFORM CARRIER.
(Application filed July 20, 1900.)
(No Model.) 3 Sheets—Sheet 2.
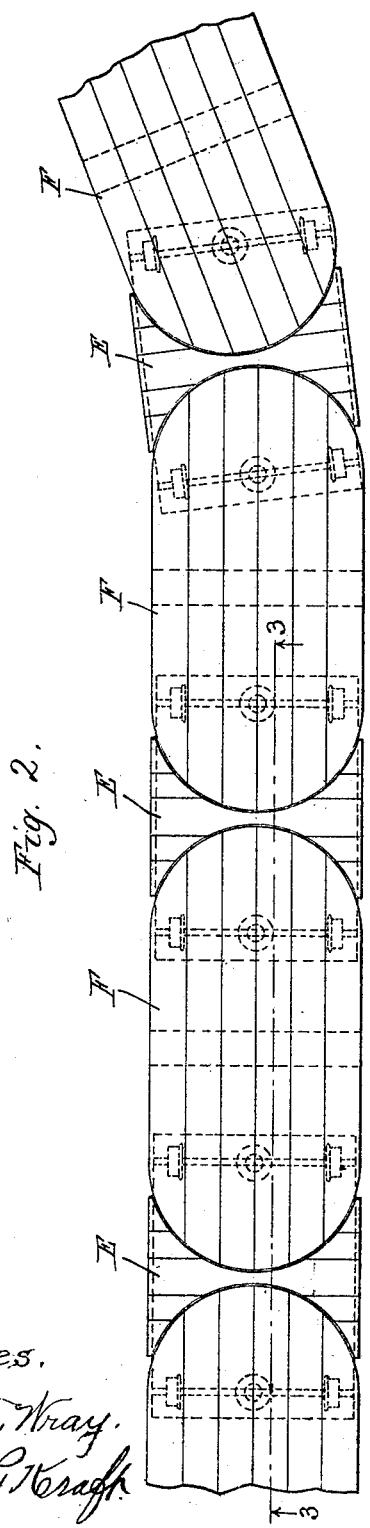
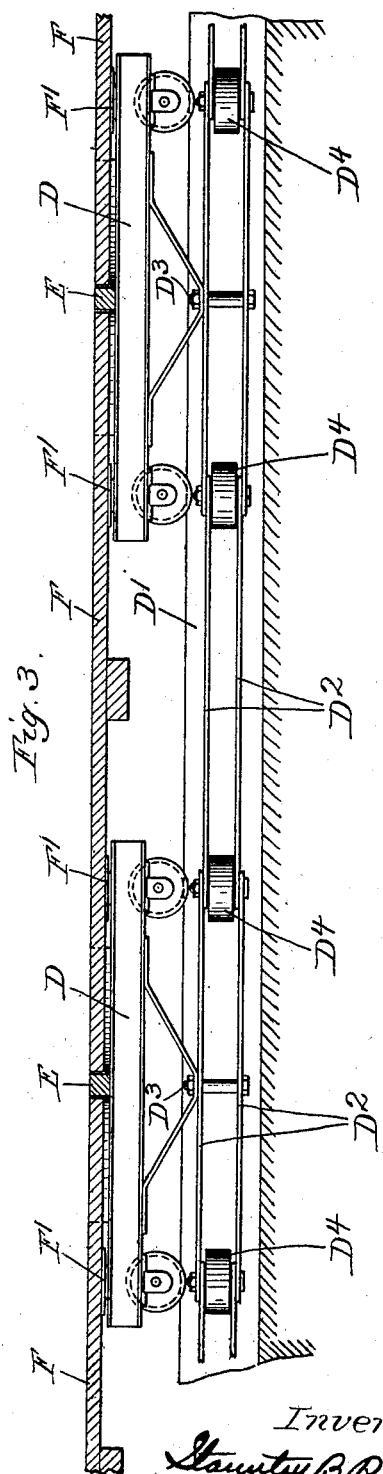
Witnesses.
Edward T. Wray.
Homer L. Krafft.
Inventor.
Stanley B. Peck
by Parker & Carter
his Atty's.

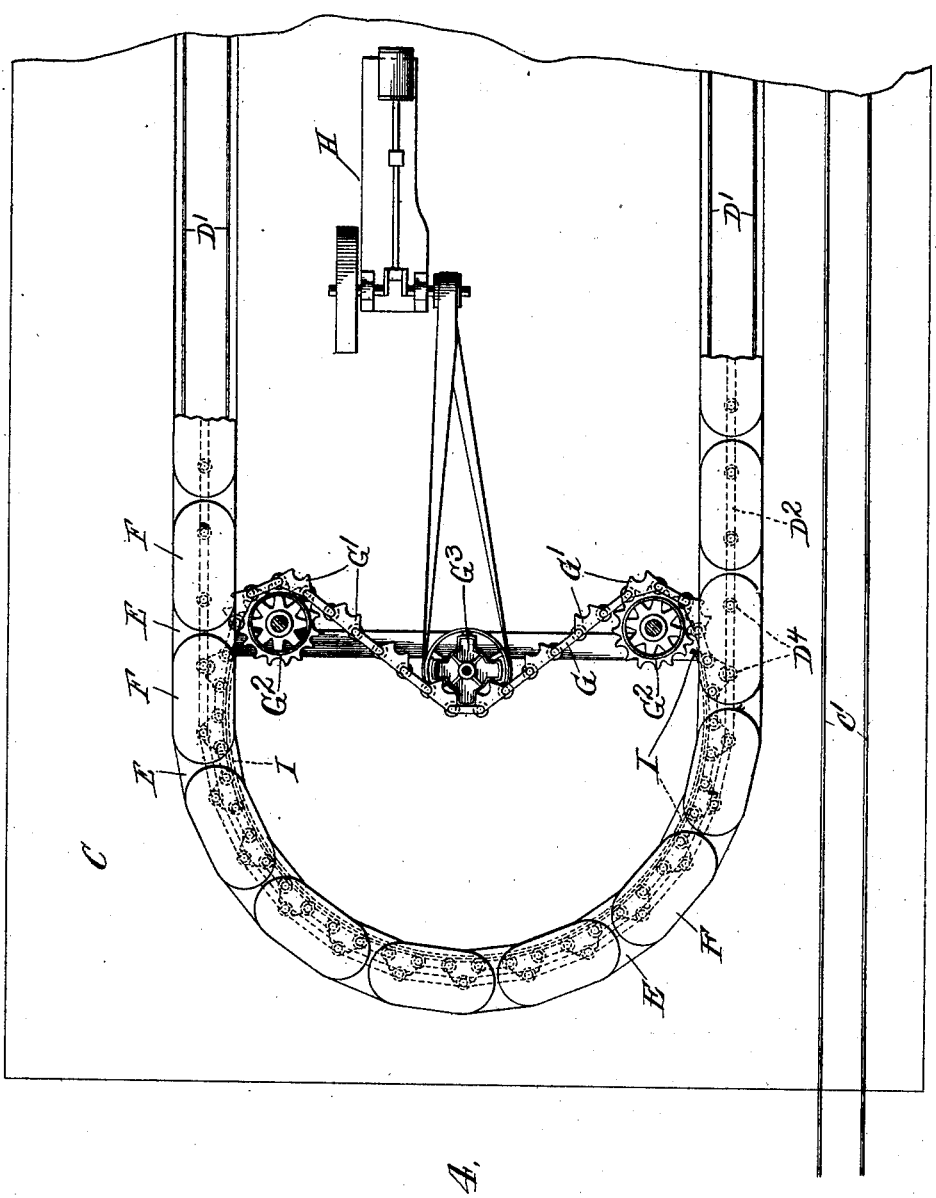

UNITED STATES PATENT OFFICE.

STAUNTON B. PECK, OF CHICAGO, ILLINOIS, ASSIGNOR TO THE LINK BELT MACHINERY COMPANY, OF CHICAGO, ILLINOIS, A CORPORATION OF ILLINOIS.

PLATFORM CARRIER.

SPECIFICATION forming part of Letters Patent No. 716,932, dated December 30, 1902.

Application filed July 20, 1900. Serial No. 24,269. (No model.)

*To all whom it may concern:*

Be it known that I, STAUNTON B. PECK, a citizen of the United States, residing at Chicago, in the county of Cook and State of Illinois, have invented a certain new and useful Improvement in Platform Carriers, of which the following is a specification.

My invention relates to devices for carrying freight along platforms, wharfs, and the like, and has for its object to provide a new and improved device of this description.

My invention is illustrated in the accompanying drawings, wherein—

Figure 1 is a diagrammatic plan view showing a carrier embodying my invention. Fig. 2 is an enlarged view showing the construction of the carrier. Fig. 3 is a longitudinal sectional view through the platform and a side elevation of a portion of the carrier. Fig. 4 is an enlarged view showing one means of driving the carrier.

Like letters refer to like parts throughout the several figures.

One of the objects of my invention is to provide a suitable platform—such as a wharf, freight-platform, or the like—with a traveling carrier, which will not obstruct the platform or floor and which will be substantially flush therewith and will present a smooth substantially continuous surface having no variable openings at the points of curvature.

Referring now to the drawings, I have shown diagammatically in Fig. 1 a form of carrier embodying my invention. This carrier A, as shown, is an endless carrier and is associated with the floor or platform B, which in this case is a wharf. In Fig. 1 I have shown the carrier as passing along the wharf B and being looped about the freight-platform C, so that freight can be transferred from the cars on the track C' to a boat at the side of the wharf B by simply unloading it and placing it upon the traveling carrier, which will convey it to its destination. An endless carrier must pass around curves at certain locations, and in the construction herein shown the parts are so arranged that there are no variable openings produced by the carrier turning the curves. As shown in Figs. 2 and 3, the carrier is made up of a series of trucks D, which travel along suitable rails or guiding devices D' and which carry the parts upon which the freight or other articles are supported. These trucks are connected with a chain $D^2$ and are preferably pivotally connected to this chain near the middle by means of the pivots $D^3$. The surface of the carrier is composed of a series of what may be termed "abutting" parts E and F. The parts F are pivotally connected at each end to adjacent trucks D by the pivots F', so that they, as it were, span the space between the trucks. The parts E are mounted upon the trucks between the parts F and are cut away to receive the ends of the parts F, said ends being curved, as shown. The ends of the parts F and the opposed faces on the parts E—that is, the abutting faces of the two parts E and F—are preferably arcs of circles having their centers located at the points where the parts F are pivotally connected to the trucks—that is, the pivotal points F'. It will be seen that this construction permits the parts F and E to move relatively as they pass around the curve, as is necessary under such conditions, and yet there are no variable openings produced by this relative movement. This insures a substantially continuous and even surface at all points and prevents articles or persons from becoming entangled with the carrier or injured thereby. It will also be seen that there are no overlapping parts to obstruct the floor or platform, but that the carrier presents a substantially flat and even surface, which in no manner obstructs the floor or platform or hinders the movement of freight or other articles thereon.

The relatively movable parts E and F may be made up in any desired manner and may be supported by any desired construction. I have shown the steel trucks D as being one of the simplest and most efficient ways of supporting them.

The chain $D^2$ is preferably made of large links substantially equal in length to the distance between the axles of the trucks, preferably provided at their joints with rollers $D^4$, which bear against suitable guides at the turns. The chain $D^2$ may be driven in any desired manner. I prefer to provide a driving-chain G, which is made of small links, so that it can pass around small pulleys or sprocket-wheels, as shown in Fig. 1. This driving-chain is preferably located at one of the turns and is provided at intervals with projections G', which engage the chain D², so as to drive it, the projections being properly distanced for this purpose. This chain G is driven by any suitable means—as, for example, the engine H. In Fig. 4 I have shown an enlarged view of one construction for driving this chain. In this view the driving-chain G passes around the sprocket-wheels G² and engages the driving engaging wheel G³, which is driven by the belt which connects with the motor H. The projections G', as it will be noted, engage the rollers D⁴, so as to drive the carrier. The driving-chain G is kept in contact with the carrier by means of the curved guiding-strip I, the driving-chain being provided with rollers which roll along the curved surface of this strip.

It is of course evident that any suitable mechanism for driving the carrier may be used and I have shown a simple construction for this purpose.

I have described in detail a particular construction embodying my invention; but it is of course evident that the parts may be greatly changed in many particulars and that some of the parts may be omitted and others used with parts not herein shown without departing from the spirit of my invention. It is also evident that the carrier may have numerous applications other than that herein shown, all of which will readily occur to those versed in the art. I therefore do not limit myself to the construction shown and described.

The use and operation of my invention are as follows: When the device is used as shown in Fig. 1 and it is desired to transfer freight from a boat alongside the wharf B to a train of cars on the track C', the carrier is set in motion. The freight or articles of whatsoever nature are then taken from the boat alongside the wharf B and placed upon the moving platform A. They are then carried around to the proper car on the track C' and removed from the carrier and placed in the car. The parts E and F, which form the surface of the carrier, are substantially flat and even, and the same even unbroken surface is presented at the turns, as well as when the parts are passing along a straight line. This does away with all variable openings at the turns and all overlapping of the parts, and hence when the carrier is placed flush with the floor it presents no obstruction whatever and all danger and inconvenience normally attending the use of such carriers is obviated.

I claim—

1. A platform carrier, comprising an endless flexible power-transmitting device, a series of supporting devices each pivotally connected to the power-transmitting device, a trackway upon which said supporting devices run, a part fixed to each of said supporting devices and forming a portion of the surface of the carrier, a series of intermediate parts in substantially the same plane as said fixed parts and pivotally connected at each end to one of the supporting devices, so as to span the space between them, both fixed and intermediate parts having curved abutting faces arranged to form a substantially continuous surface.

2. In a platform carrier, the combination of an endless, flexible, power-transmitting device with a series of supporting devices connected thereto, said supporting devices consisting of long parts with curved ends and short parts intermediate the curved ends of the long parts.

3. In a platform carrier, the combination of an endless, flexible, power-transmitting device with a series of carriages driven thereby, and a series of supporting devices, each alternate device being long and with curved ends and the intermediate devices short and curved to receive the ends of the longer devices and each short device, the ends of the longer devices associated therewith being supported upon a carriage.

4. In a platform carrier, the combination of a series of long platform-pieces, each with curved ends, and a series of short platform-pieces cut to fit the space between the curved ends of the adjacent long platform-pieces, a series of carriages to support such short pieces and the two adjacent ends of the long pieces, and means for driving all of said carriages simultaneously.

STAUNTON B. PECK.

Witnesses:
DONALD M. CARTER,
HOMER L. KRAFT.